United States Patent
Werner

(10) Patent No.: US 6,749,204 B2
(45) Date of Patent: Jun. 15, 2004

(54) BEVERAGE CUP HOLDER FOR A SHOPPING CART

(75) Inventor: Brent E. Werner, Arvada, CO (US)

(73) Assignee: BEW Enterprises, LLC, Arvada, CO (US)

( * ) Notice: Subject to any disclaimer, the term of this patent is extended or adjusted under 35 U.S.C. 154(b) by 0 days.

(21) Appl. No.: 10/046,678

(22) Filed: Jan. 16, 2002

(65) Prior Publication Data

US 2003/0132590 A1 Jul. 17, 2003

(51) Int. Cl.$^7$ ................................................. B60R 7/00
(52) U.S. Cl. ............................ 280/33.992; 280/33.991; 280/DIG. 4; 224/411
(58) Field of Search ....................... 280/33.992, 33.991, 280/DIG. 4; D34/27; 224/411, 282, 926; 211/74, 75

(56) References Cited

U.S. PATENT DOCUMENTS

| | | | | |
|---|---|---|---|---|
| 2,633,278 A | * | 3/1953 | Muniz | 224/411 |
| 2,763,413 A | * | 9/1956 | Felton | 224/411 |
| 3,116,936 A | * | 1/1964 | Magarian | 280/47.19 |
| 3,993,318 A | * | 11/1976 | Rothmayer | 280/11.26 |
| 4,708,274 A | * | 11/1987 | Roche | 224/407 |
| 4,828,211 A | * | 5/1989 | McConnell et al. | 248/311.2 |
| 4,865,346 A | * | 9/1989 | Carlile | 280/654 |
| 4,966,318 A | * | 10/1990 | Dutka | 224/411 |
| 5,056,696 A | * | 10/1991 | Lahr | 224/148.4 |
| 5,312,122 A | * | 5/1994 | Doty | 280/33.992 |
| 5,362,077 A | * | 11/1994 | Adamson | 280/33.992 |
| 5,392,802 A | * | 2/1995 | Farr et al. | 135/66 |
| 5,480,078 A | * | 1/1996 | Verrette et al. | 224/274 |
| 5,494,306 A | * | 2/1996 | Adamson et al. | 280/33.992 |
| 5,494,308 A | * | 2/1996 | Southerland | 280/33.992 |
| 5,507,507 A | * | 4/1996 | Davidson | 280/33.991 |
| 5,531,238 A | * | 7/1996 | Azzarelli et al. | 135/66 |
| 5,595,394 A | * | 1/1997 | Adamson | 280/33.993 |
| 5,597,148 A | * | 1/1997 | Gospodarich | 248/311.2 |
| D386,873 S | * | 11/1997 | D'Estaintot et al. | D34/21 |
| 5,702,114 A | * | 12/1997 | Downing et al. | 280/47.23 |
| 5,918,891 A | * | 7/1999 | Russell | 280/33.991 |
| 5,938,091 A | * | 8/1999 | Bergin et al. | 224/411 |
| 5,953,999 A | * | 9/1999 | Kanehl | 108/44 |
| 5,961,191 A | * | 10/1999 | Taylor | 312/34.8 |
| 6,176,498 B1 | * | 1/2001 | Murphy et al. | 280/33.992 |
| 2003/0042694 A1 | * | 3/2003 | Werner | 280/33.991 |

FOREIGN PATENT DOCUMENTS

EP   1065129 A1  * 1/2001  ........... B26B/03/18

* cited by examiner

*Primary Examiner*—Brian L. Johnson
*Assistant Examiner*—Kelly E Campbell
(74) *Attorney, Agent, or Firm*—Edwin H. Crabtree; Ramon L. Dizzaro; Donald W. Margolis

(57) ABSTRACT

A cup holder attached to or incorporated into a portion of an open top basket of a standard wire mesh shopping cart. The cup holder used for holding different types and sizes of beverage cups. The cup holder, in one embodiment, including a circular cup ring. The cup ring used for receiving a portion of a beverage cup therethrough. The cup ring attached to a swivel mounted on a top portion of a round vertical telescoping cup ring support. A lower portion of the cup ring support attached to a first side of the open top basket mounted on a cart frame of the shopping cart. Also, one or more cup rings may be incorporated into a bottom portion of a foldable rack attached to a rear of the open top basket. A portion of the various cup holders can include used for advertising.

5 Claims, 2 Drawing Sheets

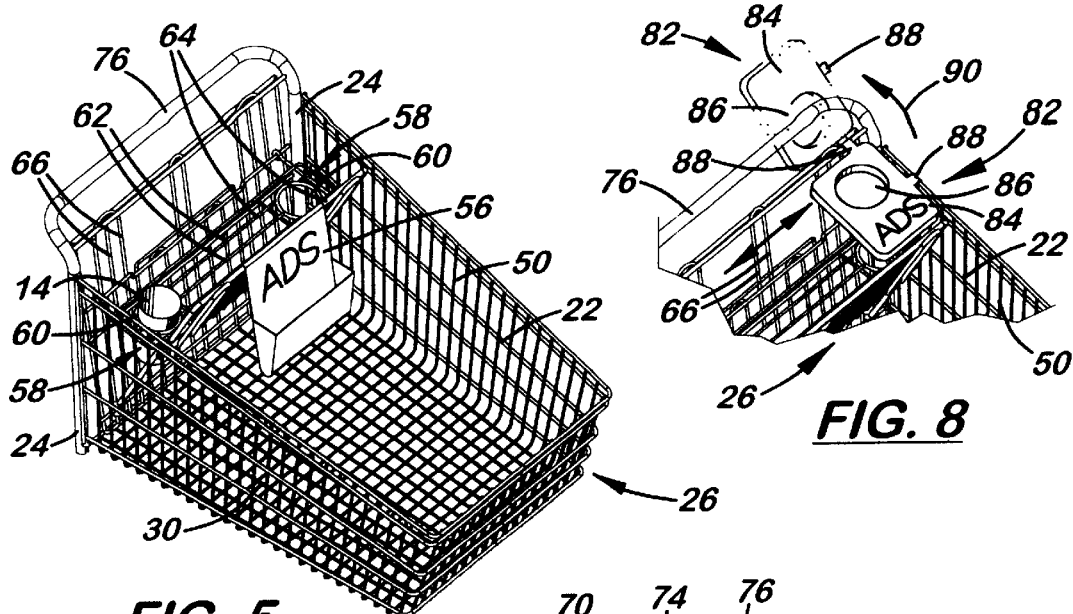
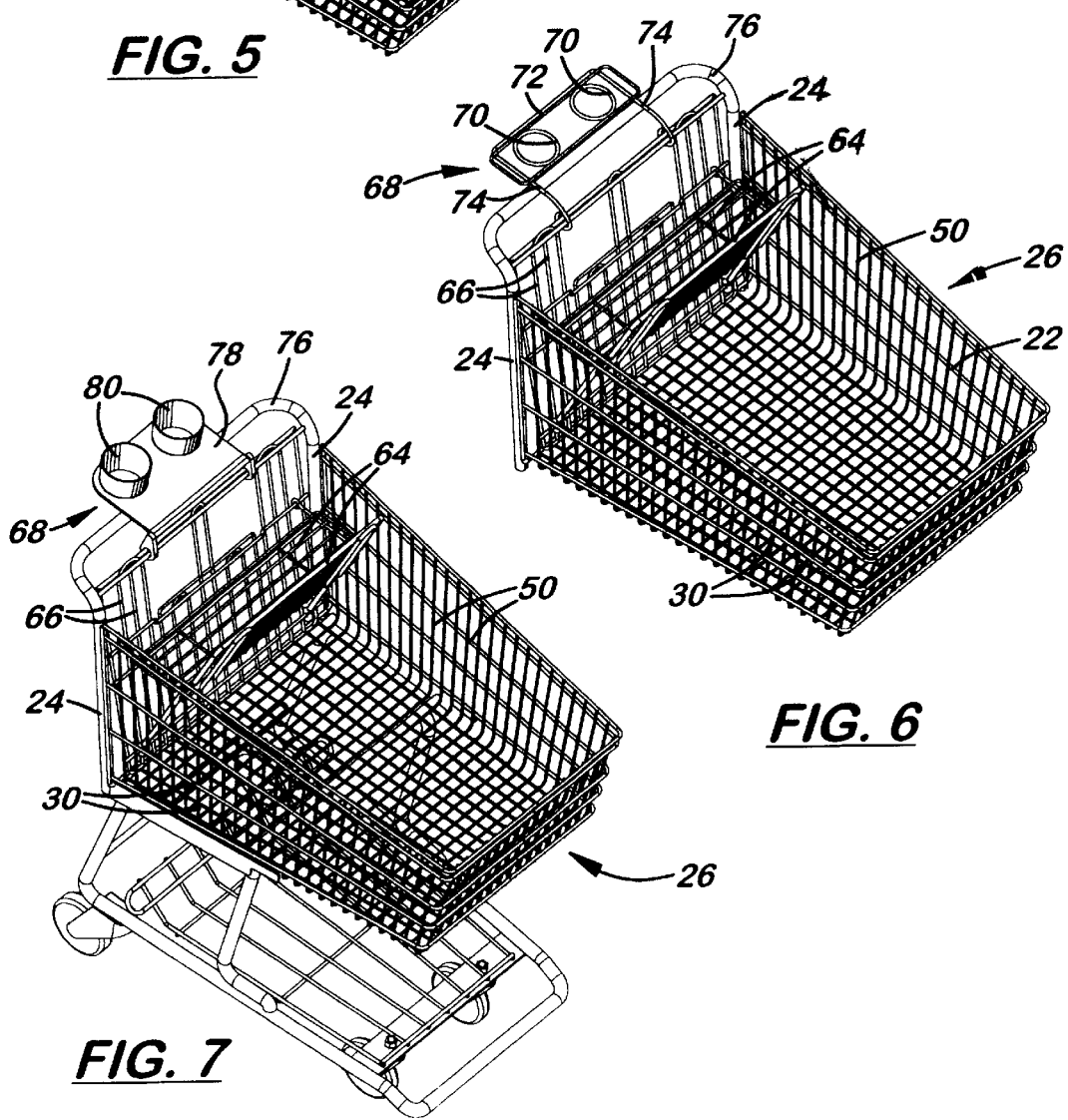

BEVERAGE CUP HOLDER FOR A SHOPPING CART

BACKGROUND OF THE INVENTION (a) Field of the Invention

This invention relates to beverage cup holders mounted on different types of shopping carts used in various types of stores and more particularly but not by way of limitation, to a beverage cup holder attached to or incorporated into a portion of an open top basket of a standard wire mesh shopping cart.

(b) Discussion of Prior Art

Heretofore, there have been a variety of different types of beverage cup holders and article holders for vehicles and shopping carts used in different types of stores. For example, in U.S. Pat. No. 5,494,306 to Adamson et al and U.S. Pat. No. 5,362,077 to Adamson, two different types of shopping cart cup holders are disclosed. One cup holder is adjustably mounted on a shopping cart handle and the other holder can be retracted under the handle of the shopping cart. In U.S. Pat. No. 6,186,382 to Bergin et al., a cup holder is illustrated having a saddle that fits over a top edge of the side of an open top shopping cart basket. In U.S. Pat. No. 5,490,653 to Ingwersen, a cup holder accessory is described for holding over-size drink cups in a standard size drink cup receptacle.

None of the above mentioned prior art shopping cart cup holders specifically disclose the unique features, structure, function and advantages of the subject invention for attaching or incorporating into a portion of an open top basket of a standard wire mesh shopping cart as described herein.

SUMMARY OF THE INVENTION

In view of the foregoing, it is a primary objective of the subject invention to provide a beverage cup holder which can be easily attached to a portion of an open top basket of a standard wire mesh shopping cart.

Another object of the invention is to provide one or more beverage cup holders that can be attached to the shopping cart but not interfere with the operation of the cart or when the cart is nested inside another shopping cart.

Still another object of the beverage cup holder is it can be telescoping for adjusting the height of the holder for the convenience of the user of the shopping cart.

Yet another object of the cup holder is a portion of holder itself can be used for advertising without interfering with the operation of holding and removing the beverage cup.

A further object of the invention is the cup holder can include a small item carrier for items that typically might fall through the openings in the wire mesh of the open top basket of the shopping cart.

Another object of the cup holder is it can be attached to a first side of the open top basket, attached to a handle of the shopping cart or incorporated into a bottom portion of the a foldable rack mounted at a rear of the open top basket.

The cup holder, in one embodiment, includes a circular cup ring. The cup ring is used for receiving a portion of a beverage cup therethrough. The cup ring is attached to a swivel. The swivel is mounted on a top portion of a round vertical telescoping cup ring support. The cup ring can be moved horizontally to various positions above the top of an open top basket of the shopping cart or to the side of the open top basket. The top portion of the ring support is slidably received in a lower portion of the cup ring support. The lower portion of the cup ring support is attached to a first side of the open top basket. The open top basket is mounted on a cart frame of the shopping cart. The cup ring support is designed to be raised and lowered to various heights for the convenience of the user of the shopping cart. A portion of the cup holder can be used for advertising.

These and other objects of the present invention will become apparent to those familiar with different types of beverage cup holders and cup holders used with shopping carts when reviewing the following detailed description, showing novel construction, combination, and the various embodiments of the beverage cup holder as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate accompanying drawings complete preferred embodiments in the present invention according to the best modes presently devised for the practical application of the principles thereof, and in which:

FIG. 5 is a perspective view of the cup holder with a cup ring incorporated into a bottom portion of a foldable rack mounted to a rear of the open top basket.

FIG. 6 is a perspective view of the cup holder having a pair of cup rings attached to a ring frame. The ring frame is pivotally attached to the rear of the open top basket.

FIG. 7 is similar to the cup holder shown in FIG. 6 and illustrates a pair of cup rings mounted on a cup plate. The cup plate is pivotally attached to the rear of the open top basket.

FIG. 8 is a perspective view of the cup holder having a cup plate with cup opening therein. The cup plate includes a pair of clips of releasable attachment to a rear and side of the open top basket or to the shopping cart handle and a side of the open top basket.

DESCRIPTION OF THE PREFERRED EMBODIMENTS

Figure 1:
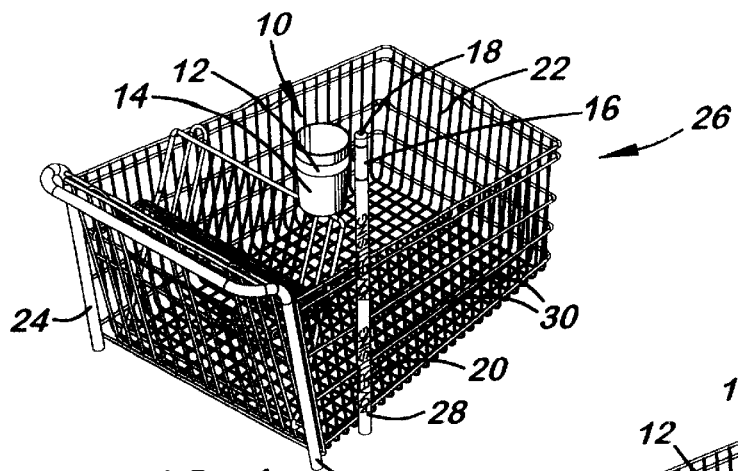
FIG. 1 is a perspective view of the beverage cup holder attached to a swivel mounted on a top portion of a round telescoping cup ring support. The cup ring support is attached to a first side of an open top basket of the shopping cart.

In FIG. 1, a perspective view of the subject beverage cup holder is shown and having general reference numeral 10. The cup holder 10 includes a circular cup ring 12 adapted for receiving a portion of a beverage cup 14 therethrough. The cup ring 12 is attached to a swivel 16. The swivel 16 is mounted on a top portion 18 of a round vertical telescoping cup ring support 20. The cup ring 12 can be moved horizontally to various positions above the top of an open top basket 22 mounted on a frame 24 of a shopping cart. The shopping cart is shown having a general reference numeral 26 and is a typical wire mesh shopping cart used in various retail stores. The top portion 18 of the ring support 20 is slidably received in a lower portion 28 of the cup ring support 20. The cup ring support 20 is attached to a first side 30 of the open top basket 22. Using the telescoping cup ring support 20, the cup ring 12 and beverage cup 14 can be adjusted to various heights above the open top basket 22 for the convenience of the user of the shopping cart 26. Also, a portion of the cup ring support 20 can be used for advertising.

Figure 2:
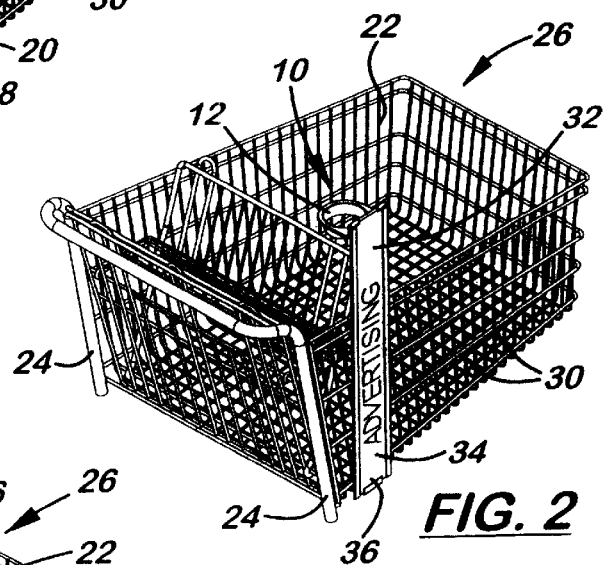
FIG. 2 is a perspective view of a similar cup holder as shown in FIG. 1 and includes a flat vertical slide cup ring support.

In FIG. 2 is a perspective view of a similar cup holder 10 as shown in FIG. 1. In this example, the cup ring 12 is pivotally attached to a top portion 32 of a flat vertical slide ring support 34. The top portion 32 is slidably received in the top of a bottom portion 36. The bottom portion 36 is attached to the first side 30 of the open top basket 22.

Figure 3:
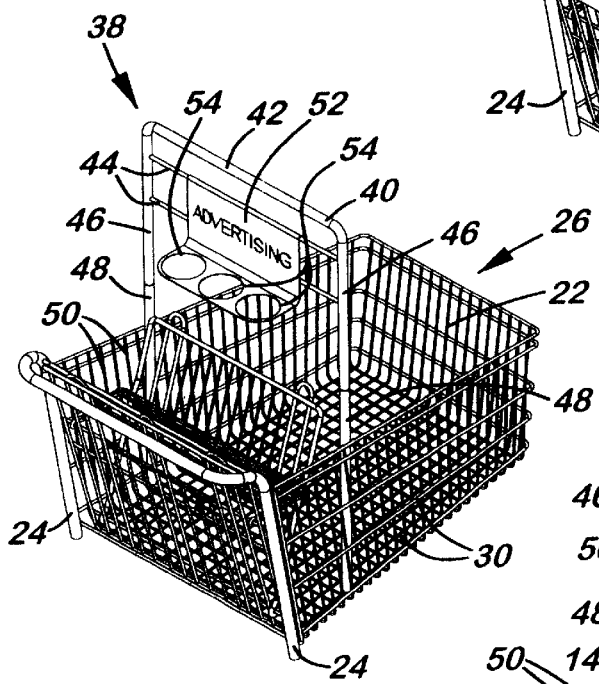
FIG. 3 is another perspective view of a cup holder mounted on an inverted "U" shaped cup support. The cup holder having a plurality of cup holes in a cup holder plate for holding more than one beverage cup.

In FIG. 3, another perspective view of a beverage cup holder is shown having general reference number 38. The cup holder 38 includes an inverted "U" shaped cup support 40 having a horizontal cross member 42, two horizontal support members 44 and two downwardly extending vertical telescoping members 46. A lower portion 48 of the two vertical members 46 are attached to the first side 30 and a second side 50 of the open top basket 22. The cup holder 38 includes an "L" shaped cup plate 52 having a plurality of cup holes 54 therein for holding more than one beverage cups. The top of the cup plate 52 is pivotally attached to one of the horizontal support members 44.

Figure 4:
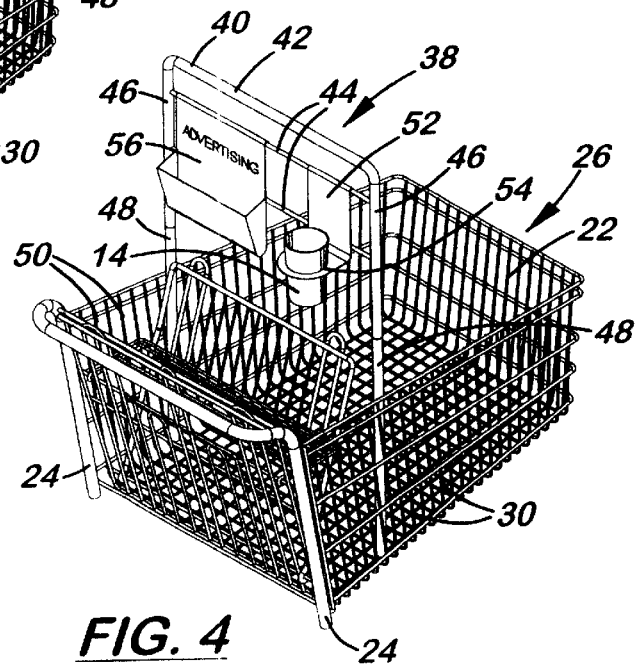
FIG. 4 is similar to the cup holder shown in FIG. 3 and illustrates the inverted "U" shaped cup support with a cup holder plate and a small item carrier suspended therefrom.

In FIG. 4, the cup holder 38, similar to the holder shown in FIG. 3, is illustrated with the inverted "U" shaped cup support 40 including the "L" shaped cup plate 52 having a single cup hole 54. Also, the cup holder 38 includes a small item carrier 56 pivotally suspended from one of the horizontal support members 44. The small item carrier 56 is used for holding various items that typically would fall through the openings in the wire mesh open top basket 22.

In FIG. 5, a perspective view of a cup holder is shown having a general reference numeral 58. The cup holder 58 in this example includes a pair of cup ring 60, which are incorporated into a bottom portion 62 of a foldable rack 64. The foldable rack 64 is mounted to a rear 66 of the open top basket 22. The cup rings 60 are obviously sized for receiving a portion of a beverage cup 14 therethrough and holding the cup upright in the foldable rack 64 of the shopping cart 26. In this drawing, the foldable rack 64 is shown with the small item carrier 56 suspended therefrom for use by the user of the shopping cart 26 in holding small items that would normally fall through the openings in the open top basket 22.

In FIG. 6, a perspective view of still another the cup holder having a general reference numeral 68. The cup holder 68 includes a pair of cup rings 70 attached to a ring frame 72. The ring frame 72 includes a pair of pivot arms 74 pivotally attached to the rear 66 of the open top basket 22. The pivot arms 74 are shown resting on a portion of a handle 76 attached to the frame 24 of the shopping cart 26.

In FIG. 7, a perspective view of the cup holder 68 having a cup plate 78 rather than a ring frame 72 is shown. The cup plate 78 includes a pair of upwardly extending cups 80, which are dimensioned for receiving the lower portion of the beverage cup 14. The cup plate 78 is pivotally attached to the rear 66 of the open top basket 22. A bottom portion of the cup plate 78 rests on a portion of the handle 76.

In FIG. 8, a perspective view of still another cup holder having a general reference numeral 82. The cup holder 82 in this example includes a cup plate 84 with a cup opening 86 therethrough. The cup plate 84 includes a pair of clips 88 used for releasable attachment to the first side 30 or second side 50 and the rear 66 of the open top basket 22. The clips 88 can also be used for releasably attaching the cup plate 84 to the handle 76 and one of the sides of the open top basket 22. In this drawing, the cup holder 82 is shown in dashed lines in a raised position as indicated by arrow 90. by releasing the clip 88 attached to the second side 50, the cup plate 84 is rotated upwardly on the clip 88 attached to the rear 66. In this manner, the cup holder 82 can be moved out of the way with the foldable rack 64 is folded against the rear 66 of the open top basket 22.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. A cup holder mounted in a portion of a wire mesh open top basket of a shopping cart, the cup holder for holding different types and sizes of a beverage cup, the cup holder comprising:

a wire mesh foldable rack adapted for mounting on a rear of the open top basket of the shopping cart, said foldable rack having a wire mesh bottom portion disposed in a substantially horizontal position when said foldable rack is in an unfolded position for use in the shopping cart;

a first cup ring incorporated into the wire mesh bottom portion of said foldable rack, said first cup ring adapted for receiving the beverage cup therein when said foldable rack is unfolded on the shopping cart, and a second cup ring incorporated into the wire mesh bottom portion of said foldable rack, said second cup ring adapted for receiving another beverage cup therein when said foldable rack is unfolded on the shopping cart.

2. The cup bolder as described in claim 1 wherein said first and second cup rings are disposed in opposite ends of the wire mesh bottom portion of said foldable rack.

3. The cup holder as described in claim 1 further including a small item carrier attached to a front portion of said foldable rack and suspended therefrom, said small item carrier adapted for holding small items therein when using the shopping cart.

4. A cup holder mounted in a portion of a wire mesh open top basket of a shopping cart, the cup holder for holding different types and sizes of a beverage cup, the cup holder comprising:

a wire mesh foldable rack adapted for mounting on a rear of the open top basket of the shopping cart, said foldable rack having a wire mesh bottom portion disposed in a substantially horizontal position when said foldable rack is in an unfolded position for use in the shopping cart;

a first cup ring incorporated into one end of the wire mesh bottom portion of said foldable rack, said first cup ring adapted for receiving the beverage cup therein when said foldable rack is unfolded on the shopping cart; and a second cup ring incorporated into an opposite end of the wire mesh bottom portion of said foldable rack, said second cup ring adapted for receiving another beverage cup therein when said foldable rack is unfolded on the shopping cart.

5. The cup holder as described in claim 4 further including a small item carrier attached to a front portion of said foldable rack and suspended therefrom, said small item carrier adapted for holding small items therein when using the shopping cart.

* * * * *